United States Patent
Uziel et al.

(10) Patent No.: US 11,546,888 B2
(45) Date of Patent: Jan. 3, 2023

(54) NON-RANDOM CYCLIC SHIFT SELECTION TO AVOID CYCLIC SHIFT COLLISION FOR SIDELINK CONTROL CHANNEL

(71) Applicant: QUALCOMM Incorporated, San Diego, CA (US)

(72) Inventors: Lior Uziel, Hod Hasharon (IL); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/827,513

(22) Filed: Mar. 23, 2020

(65) Prior Publication Data
US 2021/0306992 A1    Sep. 30, 2021

(51) Int. Cl.
*H04W 72/04* (2009.01)

(52) U.S. Cl.
CPC ... *H04W 72/0406* (2013.01); *H04W 72/0486* (2013.01)

(58) Field of Classification Search
None
See application file for complete search history.

(56) References Cited

U.S. PATENT DOCUMENTS

| | | | | |
|---|---|---|---|---|
| 2010/0173625 A1* | 7/2010 | Noh | ...... | H04L 5/0055 455/422.1 |
| 2017/0019887 A1* | 1/2017 | Jiang | ...... | H04W 72/042 |
| 2018/0048446 A1 | 2/2018 | Jiang et al. | | |
| 2018/0048994 A1* | 2/2018 | Kwon | ...... | H04W 72/02 |
| 2019/0014563 A1* | 1/2019 | Lee | ...... | H04L 5/0042 |
| 2019/0036667 A1* | 1/2019 | Wang | ...... | H04L 5/0094 |

(Continued)

FOREIGN PATENT DOCUMENTS

EP    3591866 A1    1/2020

OTHER PUBLICATIONS

Asia Pacific Telecom: "Discussion on Sidelink Resource Allocation Mode 2", 3GPP Draft, 3GPP TSG-RAN WG1 Meeting #98, R1-1908929, 3rd Generation Partnership Project (3GPP), Mobile Competence Centre, 650, Route Des Lucioles, F-06921 Sophia-Antipolis Cedex, vol. RAN WG1, No. Prague, Czech Republic, Aug. 26, 2019-Aug. 30, 2019, Aug. 16, 2019 (Aug. 16, 2019), XP051765536, 6 Pages, Retrieved from the Internet: URL:http://www.3gpp.org/ftp/tsg_ran/WG1_RL1/TSGR1_98/Docs/R1-1908929.zip [retrieved on Aug. 16, 2019] the whole document.

(Continued)

*Primary Examiner* — Nicholas Sloms
(74) *Attorney, Agent, or Firm* — Procopio, Cory, Hargreaves & Savitch LLP

(57) ABSTRACT

A user equipment (UE) transmits a first transmission comprising first sidelink control information (SCI) using a first cyclic shift, where the first SCI includes information about a second cyclic shift of second SCI for a second transmission from the UE. The UE then transmits the second transmission comprising the second SCI using the second cyclic shift. A receiving UE receives, from a second UE, a first transmission comprising first SCI having a first cyclic shift and uses information in the first SCI to determine cyclic shift information about a second cyclic shift of second SCI for a second transmission from the UE. The receiving UE may exclude the second cyclic shift from selection using the information received in the first SCI.

28 Claims, 11 Drawing Sheets

(56) References Cited

U.S. PATENT DOCUMENTS

| | | | |
|---|---|---|---|
| 2020/0037126 A1* | 1/2020 | Lee | H04L 5/0048 |
| 2020/0146000 A1* | 5/2020 | Shin | H04L 5/0053 |
| 2020/0288286 A1* | 9/2020 | Hwang | H04L 1/1861 |
| 2020/0288486 A1* | 9/2020 | Kwak | H04W 72/1263 |
| 2020/0313818 A1* | 10/2020 | Wu | H04W 72/042 |
| 2020/0337067 A1* | 10/2020 | Chae | H04W 72/1263 |
| 2021/0028910 A1* | 1/2021 | Cheng | H04L 5/0064 |
| 2021/0058900 A1* | 2/2021 | Lien | H04L 1/1812 |
| 2021/0112544 A1* | 4/2021 | Chen | H04W 52/242 |

OTHER PUBLICATIONS

Intel Corporation: "PSSCH DMRS Generation for Sidelink V2V Communication", 3GPP Draft, 3GPP TSG RAN WG1 Meeting #87, R1-1611919, 3rd Generation Partnership Project (3GPP), Mobile Competence Centre, 650, Route Des Lucioles, F-06921 Sophia-Antipolis Cedex, France vol. RAN WG1, No. Reno, USA, Nov. 14, 2016-Nov. 18, 2016, Nov. 13, 2016 (Nov. 13, 2016), XP051175885, pp. 1-3, Retrieved from the Internet: URL: http://www.3gpp.org/ftp/Meetings_3GPP_SYNC/RAN1/Docs/, [retrieved on Nov. 13, 2016], the whole document, p. 2, Paragraph 4.1.

International Search Report and Written Opinion—PCT/US2021/023773—ISA/EPO—dated Jul. 5, 2021.

ITL: "Discussion on NR V2X HARQ Mechanism", 3GPP Draft, 3GPP TSG RAN WG1 Ad-Hoc Meeting 1901, R1-1901146, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593990, pp. 1-5, URL: http://www.3gpp.org/ftp/Meetings%5F3GPP%5FSYNC/RAN1/Docs/R1%2D1901146%2Ezip [retrieved on Jan. 20, 2019] paragraph [0002]-paragraph [0004], section 1, section 3, the whole document.

* cited by examiner

NON-RANDOM CYCLIC SHIFT SELECTION TO AVOID CYCLIC SHIFT COLLISION FOR SIDELINK CONTROL CHANNEL

BACKGROUND

Technical Field

The present disclosure relates generally to communication systems, and more particularly, to vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. Aspects of wireless communication may comprise direct communication between devices, such as in V2X and/or other D2D communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus transmits a first transmission comprising first sidelink control information (SCI) using a first cyclic shift, wherein the first SCI includes information about a second cyclic shift of second SCI for a second transmission from the UE. The apparatus transmits the second transmission comprising the second SCI using the second cyclic shift.

In an aspect of the disclosure, a method, a computer-readable medium, and an apparatus are provided for wireless communication at a first UE. The apparatus receives, from a second UE, a first transmission comprising first SCI having a first cyclic shift and uses information in the first SCI to determine cyclic shift information about a second cyclic shift of second SCI for a second transmission from the UE. The apparatus may use the information received in the first SCI to exclude the second cyclic shift from selection of its own cyclic shift.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
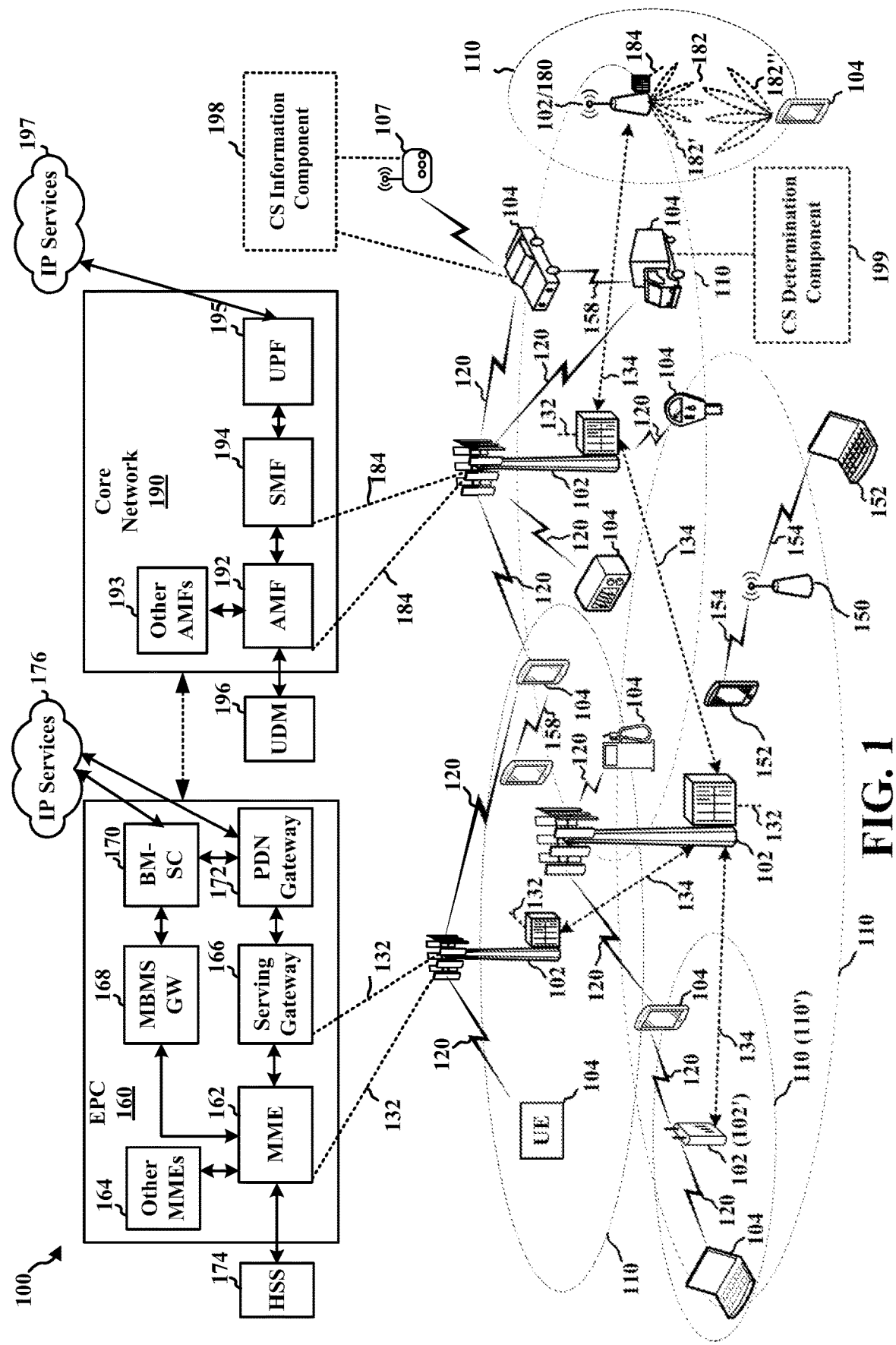
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an examples of wireless communications systems and an access networks 100. Some wireless communications system (also referred to as a wireless wide area network (WWAN)) may include base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations 180, such as a gNB may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, such as base station 180, may utilize beamforming 182 with the UE 104 to compensate for the extremely high path loss and short range.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it should be understood that the term "sub-6 GHz" if used herein by way of example may represent all or part of FR1 for 5G NR. Further, unless specifically stated otherwise, it should be understood that the term "millimeter wave" as used herein by way of example may represent all or part of FR2 for 5G NR and/or all or part of a 30 GHz-300 GHz waveband. It should also be understood that the terms "sub-6 GHz" and "millimeter wave," are intended to represent modifications to such example frequency bands that may occur do to author/entity decisions regarding wireless communications, e.g., as presented by example herein.

It should be understood that the above examples are not necessarily intended to limit claimed subject matter. For example, unless specifically recited, claimed subject matter relating to wireless communications is not necessarily intended to be limited to any particular author/entity defined frequency band, or the like.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some UEs 104 may communicate with each other using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

Some wireless communication networks may include D2D communication between vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), cellular vehicle-to-everything (C-V2X) and/or a combination thereof and/or with other devices, which can be collectively referred to as vehicle-to-anything (V2X) communications. Although FIG. 1 illustrates that come communication systems may include a base station 102 or 180, V2X communication may be performed without a base station, in some examples. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or other D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The UE may transmit communication, such as V2X or other D2D communication, that includes SCI using a cyclic shift. The cyclic shift may be randomly selected from a set of potential cyclic shifts (such as from a set of {0, 3, 6, 9}). Referring again to FIG. 1, in certain aspects, the UE 104 may include a cyclic shift (CS) information component 198 configured to transmit a first SCI that includes information about a second cyclic shift of a second SCI. The UE 104 may then transmit the second SCI using the second cyclic shift. In some examples, the first SCI may be comprised in an initial transmission, and the second SCI may be a retransmission. In some examples, the first SCI and the second SCI may be comprised in semi-persistent scheduling (SPS) transmissions. A receiving UE (e.g., another UE 104) may include a CS determination component 199 configured to receive the first SCI and use the information in the first SCI to determine information about the second cyclic shift of the second SCI, e.g., whether a second cyclic shift of the second SCI is the same as the first cyclic shift and/or a particular value for the second cyclic shift. The UE 104 may then exclude the second cyclic shift from its own cyclic shift selection. Therefore, the information carried in the first SCI may help the receiving UE to avoid a cyclic shift collision. Although aspects have been described in connection with UE 104, a RSU or other V2X device may similarly include a CS information component 198 and/or a CS determination component 199. As well, a UE 104 may include both a CS information component 198, which the UE 104 uses when transmitting communication, and a CS determination component 199 that the UE uses when receiving communication.

Figure 2:
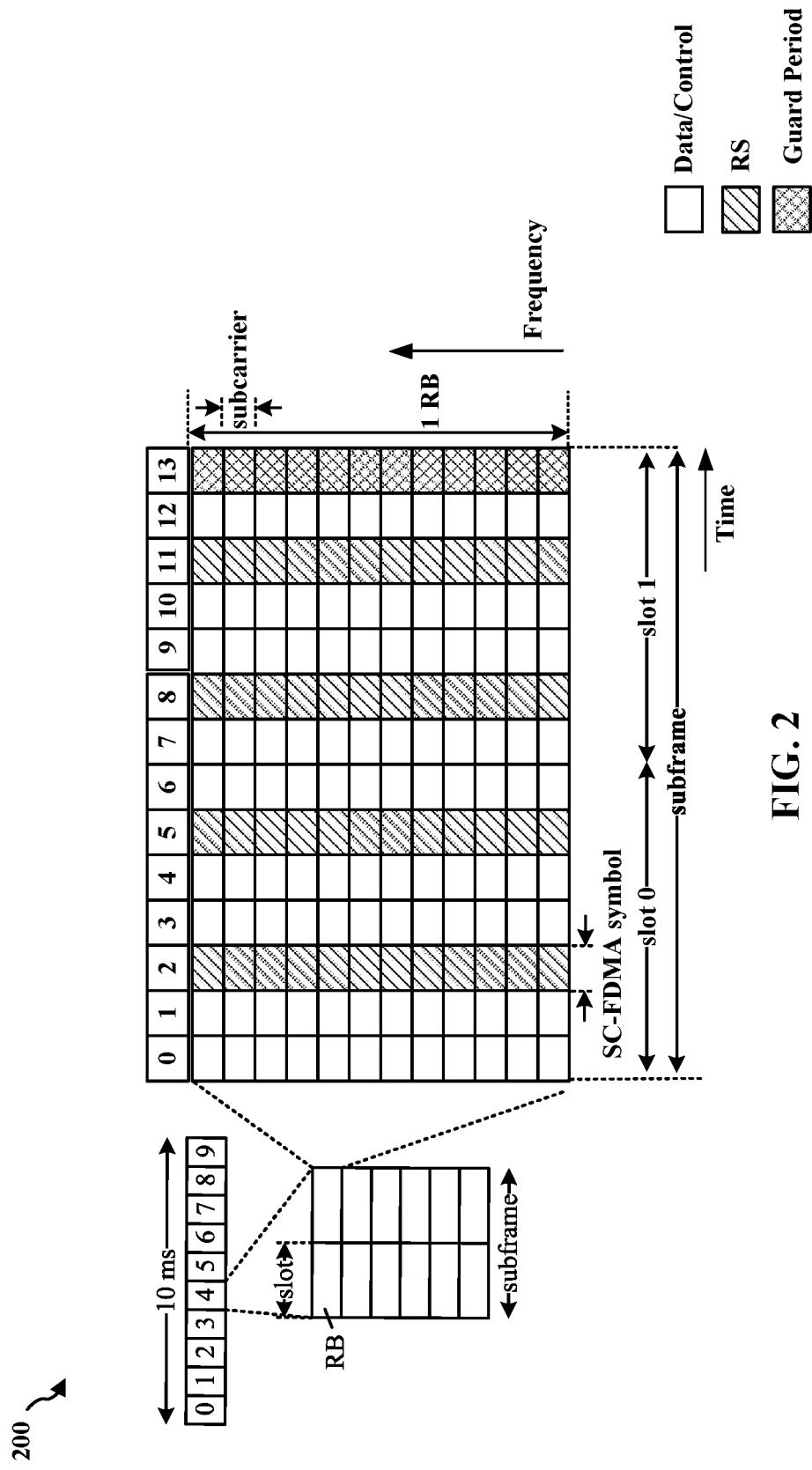
FIG. 2 illustrates example aspects of a sidelink slot structure.

FIG. 2 illustrates an example diagram 200 illustrating a sidelink subframe within a frame structure that may be used for sidelink communication, e.g., between UEs 104, between a UE and infrastructure, between a UE and an RSU, etc. FIG. 1 is merely one example of a potential frame structure, and the aspects presented herein can be applied to other frame structures, as well. In some examples, the frame structure may be based on an LTE frame structure. In some examples, the slot structure may be based on a 5GNR frame structure. For example, the concepts described herein may be applicable to other similar areas, such as 5GNR, LTE, LTE-A, CDMA, GSM, and other wireless technologies. The example in FIG. 2 is merely one example, and other wireless communication technologies may have a different frame structure and/or different channels. A frame (10 ms) may be divided into 10 equally sized subframes (1 ms). Each subframe may include two slots. Each slot may include 7 SC-FDMA symbols. For slot configuration 0, each slot may include 14 symbols, and for slot configuration 1, each slot may include 7 symbols. Although the diagram 200 illustrates a single RB subframe, the sidelink communication may include multiple RBs.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include a reference signal, such as a demodulation RS (DMRS). At least one symbol may be used for feedback, as described herein. A symbol prior to and/or after the feedback may be used for turnaround between reception of data and transmission of the feedback. Another symbol, e.g., at the end of the subframe may be used as a guard symbol without transmission/reception. The guard enables a device to switch from operating as a transmitting device to prepare to operate as a receiving device, e.g., in the following subframe. Data or control may be transmitted in the remaining REs, as illustrated. For example, data may be carried in a PSSCH, and the control information may be carried in a PSCCH. The control information may comprise SCI. The position of any of the reference signals, control, and data may be different than the example illustrated in FIG. 2.

Figure 3:
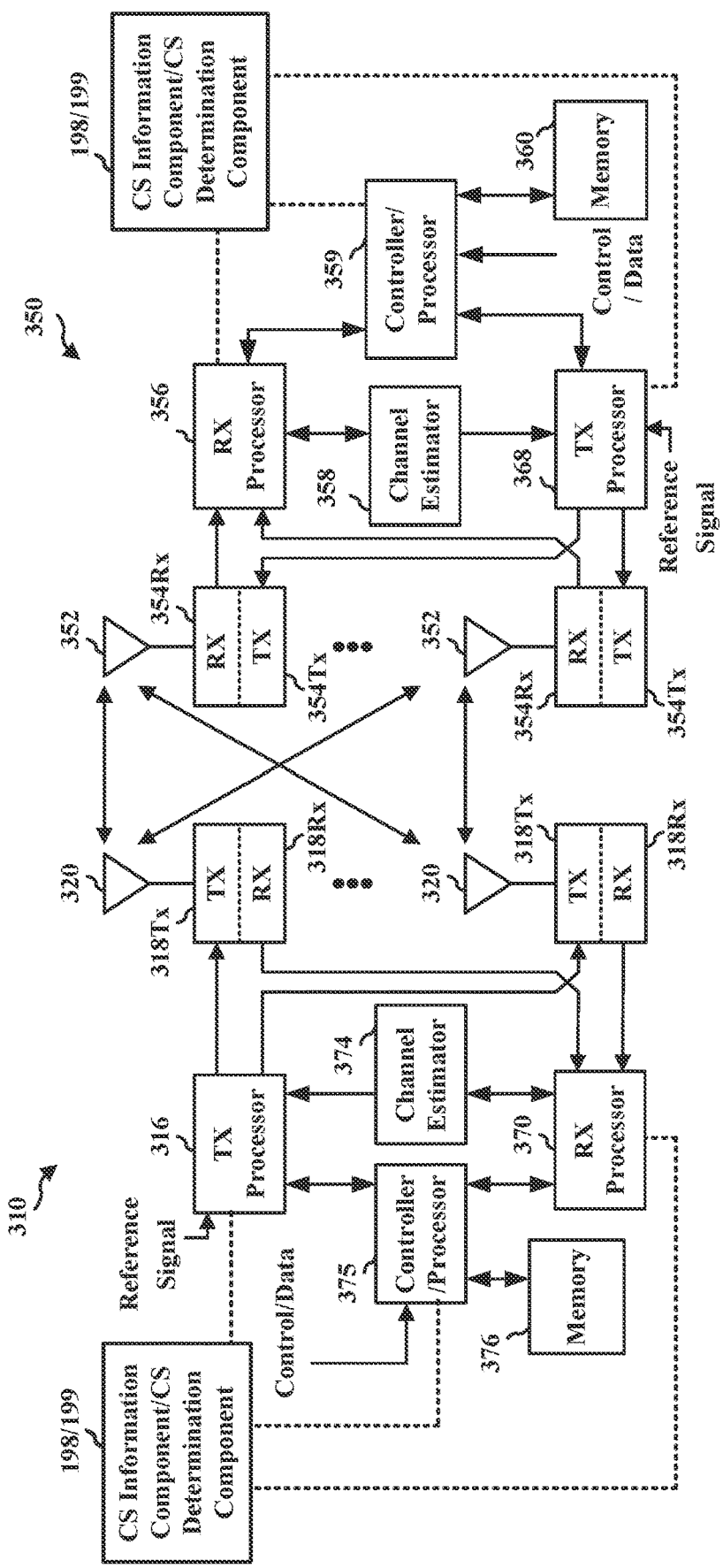
FIG. 3 is a diagram illustrating an example of a first device and a second device involved in wireless communication based, e.g., on V2X, and/or other D2D communication.

FIG. 3 is a block diagram 300 of a first device 310 configured for wireless communication with a second device 350. The devices 310 and 350 may be configured to transmit and/or receive V2X or other D2D communication. The communication may be based, e.g., on sidelink, and may be exchanged using a PC5 interface. The device 310 may comprise a UE, an RSU, or another wireless device communicating using V2X or D2D. The receiving device may comprise a UE, an RSU, or another wireless device communicating using V2X or D2D. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of the device 350 or the TX 316, the RX processor 370, or the controller/processor 375 of the device 310 may be configured to perform aspects described in connection with 198 and/or 199 of FIG. 1.

Figure 4:
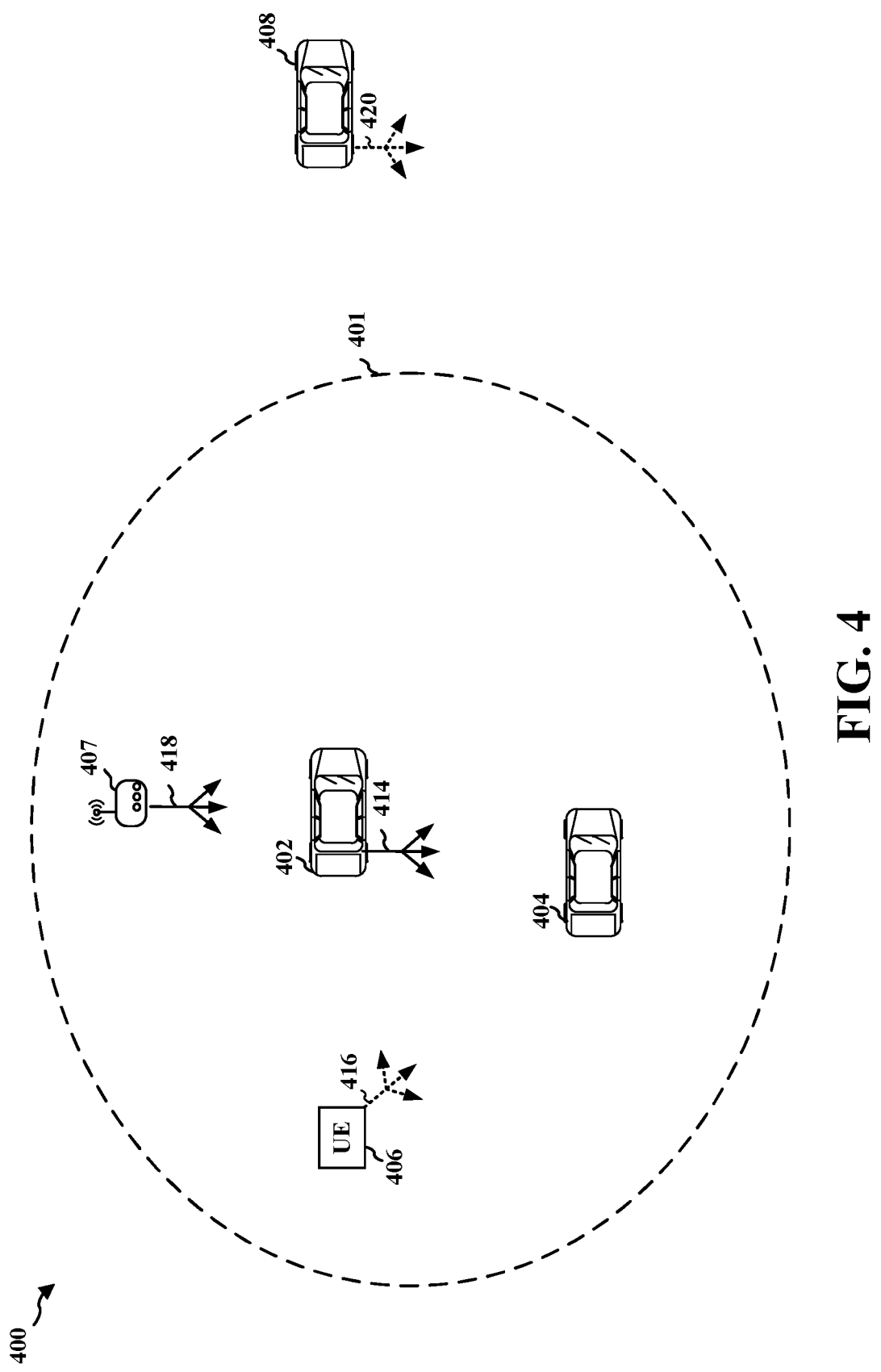
FIG. 4 illustrates a communication system including V2X or other D2D communication.

V2X or other D2D communication may be based on a structure comprising aspects described in connection with FIG. 2. FIG. 4 illustrates an example of V2X communication 400 including multiple UEs. For example, a transmitting UE 402 may transmit a transmission 414, e.g., comprising a control channel and/or a corresponding data channel, that may be received by the UEs 404, 406, 408. For example, the transmitting UE 402 may transmit a transmission comprising control information and data. A receiving UE (e.g., UE 404, 406, or 408) may receive the control information without being able to receive the corresponding data, such as based on a failed cyclic redundancy check (CRC). In some examples, the receiving UE (e.g., UE 404, 406, or 408) may receive the data portion without receiving the corresponding control information of the transmission, e.g., if the UE uses control information from an initial transmission to receive data of a retransmission. A control channel may include information for decoding a data channel and may also be used by receiving device to avoid interference by refraining from transmitting on the occupied resources during a data transmission. The resources that will be occupied by the data transmission, may be indicated in a control message from the transmitting device. For example, the UE 402 may transmit SCI in a PSCCH that provides information about the existence and location of other transmissions from the UE. SCI may be transmitted, e.g., in physical resource block(s) per slot in each subframe where the corresponding PSSCH is transmitted. The SCI may carry information about another transmission. For example, the SCI may indicate a time gap between the transmissions (e.g., between a first transmission and a second transmission). The first transmission may be an initial transmission and the retransmission may be a retransmission. The first and second transmission may be SPS transmissions. For example, the SCI may include a field that indicates a time gap between the transmissions. The SCI may also indicate time and frequency resources for the second transmission. For example, the SCI may indicate a resource reservation. The SCI may include other information for the data transmission, such as MCS information, priority information, etc. A reference signal, such as DM-RS, may be associated with the PSCCH, e.g., may be transmitted with the SCI of the PSCCH.

When transmitting the PSCCH, the UE may apply a cyclic shift to the DM-RS in a subframe. The UE may randomly select the cyclic shift to apply to the DM-RS in each PSCCH transmission. For example, the UE may select the cyclic shift from a set of possible cyclic shifts, e.g., {0, 3, 6, 9}. The UE may randomly select the cyclic shift for the DM-RS. Table 1 illustrates an example set of reference signal parameters for PSCCH, e.g., for DM-RS transmitted in the PSCCH. The UE may transmit a reference signal, such as a DM-RS associated with the SCI using any of the example reference signal parameters illustrated in Table 1, e.g., group hopping, sequence hopping, cyclic shift, orthogonal sequence, reference signal length, number of layers, and/or number of antenna ports. Different parameters may be used for different transmission modes.

As illustrated in the example in Table 1, a cyclic shift $n_{cs,\lambda}$ may be applied to the DM-RS in some sidelink transmission modes, such as sidelink transmission mode 3 and/or sidelink transmission mode 4. The UE may randomly select the cyclic shift from {0, 3, 6, 9}, in the example in Table 1.

TABLE 1

| | | PSCCH | |
|---|---|---|---|
| Reference Signal Parameter | | Sidelink transmission modes 1 and 2 | Sidelink transmission modes 3 and 4 |
| Group hopping | | disabled | disabled |
| | $n_{ID}^{RS}$ | — | — |
| | $n_s$ | — | — |
| | $f_{ss}$ | 0 | 8 |
| Sequence hopping | | disabled | disabled |
| Cyclic shift | $n_{cs,\lambda}$ | 0 | {0, 3, 6, 9} |
| Orthogonal sequence | $[w^\lambda(\cdot)]$ | [+1 +1] | [+1 +1 +1 +1] |
| Reference signal length | $M_{sc}^{RS}$ | $M_{sc}^{PSCCH}$ | $M_{sc}^{PSCCH}$ |
| Number of layers | $\upsilon$ | 1 | 1 |
| Number of antenna ports | P | 1 | 1 |

The UEs 402, 404, 406, and/or 408 may each be capable of operating as a transmitting device in addition to operating as a receiving device. Thus, the UEs 406 and 408 are illustrated as transmitting a transmissions 416 and 420, respectively. The transmissions 414, 416, and/or 420 may be broadcast or multicast to nearby devices. For example, the UE 414 may transmit communication intended for receipt by other UEs within a range 401 of UE 414. Additionally/alternatively, a UE may transmit unicast communication to a particular UE. The RSU 407 may receive communication from and/or transmit communication to the UEs 402, 404, 406, and/or 408. The UE 402, 404, 406, 408 or the RSU 407 may comprise a CS information component 198 and/or a CS determination component 199, as described in connection with FIG. 1.

As multiple UEs may broadcast V2X communication using autonomous transmissions, collisions may occur between the transmissions of different UEs. A collision refers to an overlap in time and/or frequency for a transmission from a first UE and a transmission from a second UE. In an attempt to avoid such collisions, the UEs may transmit communication after making a determination about available resources. Thus, channel access may be based on the UE's observation of available resources.

Figure 5:
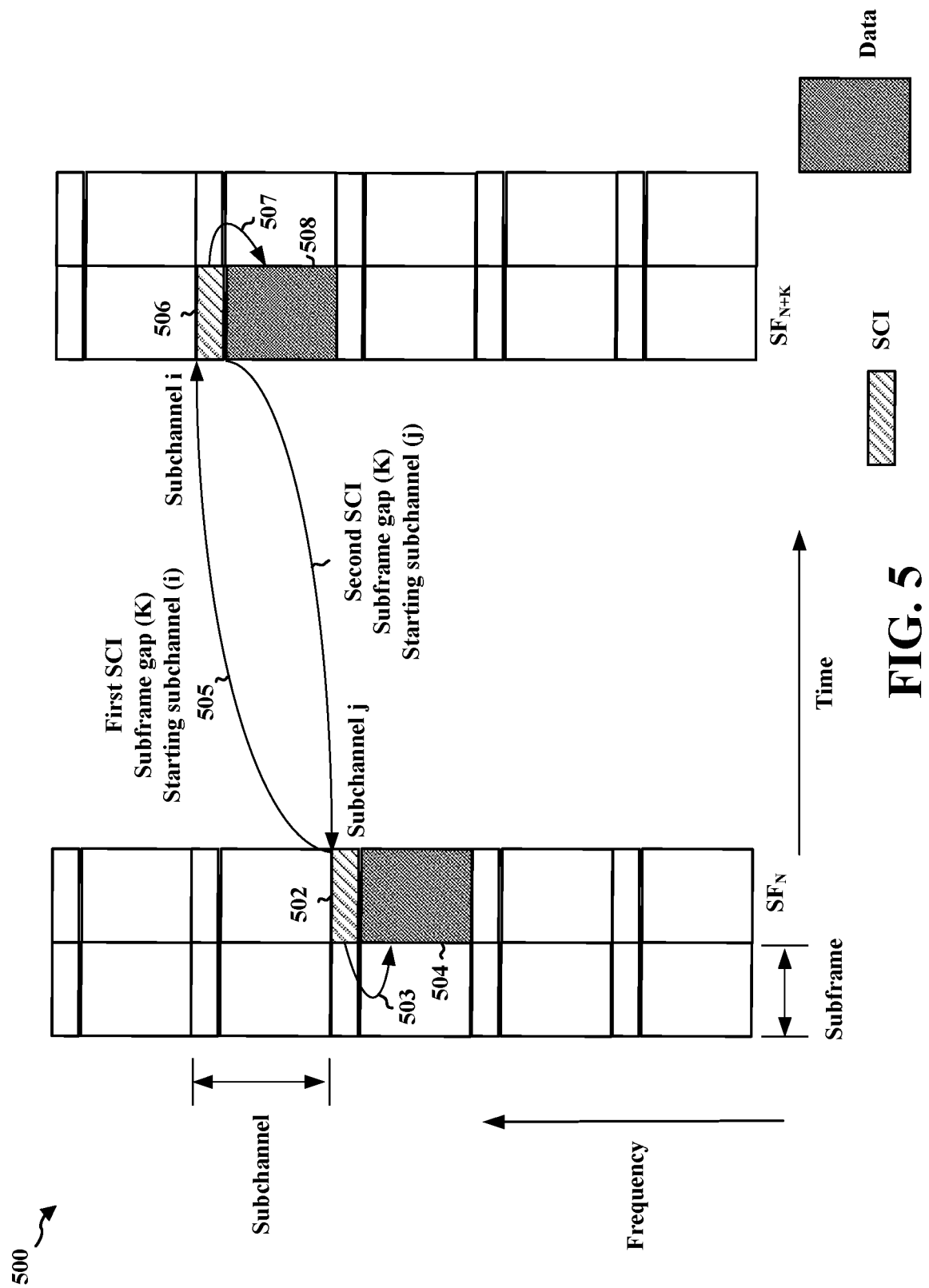
FIG. 5 illustrates an example of a first transmission that provides resource information about a second transmission.

FIG. 5 illustrates an example diagram 500 of V2X communication. Although FIG. 5 illustrates the concept using subframes, the aspects may be similarly applied to communication based on slots or other timing information. A first transmission includes SCI 502 and data 504. The example in FIG. 5 illustrates the SCI 502 and the data 504 in adjacent frequency resources. This is merely one example to illustrate the concept of a transmission including data and SCI. The SCI 502 and the data 504 may alternatively be transmitted in non-adjacent frequency resources in other examples. The SCI 502 may be transmitted in a PSCCH, and the data 504 may be transmitted in a PSSCH. As illustrated by the arrow 503, the SCI 502 includes information about the data transmission 504 that enables receiving devices to receive the data 504, e.g., MCS information, information about the frequency and/or time resources used to transmit the data, whether the data in an initial transmission or a retransmission, etc. Additionally, as illustrated by the arrow 505, the SCI 502 includes information about another transmission from the UE (e.g., SCI 506 and/or data 508). The SCI 506 and the data 508 are illustrated as being transmitted in adjacent frequency resources. In other examples, the SCI 506 and the data 508 may be transmitted in non-adjacent frequency resources.

The other transmission (e.g., data 508) may be a retransmission of the first transmission (e.g., data 504). In some examples, the first data transmission may be referred to as $RV_0$, and the second data transmission may be referred to as $RV_2$ and may be based on a HARQ binding mechanism and control. In some examples, the UE may transmit an initial transmission and two retransmissions. Therefore, the SCI 502 may indicate resources for two retransmissions.

In another example, both transmissions may be based on SPS, and each transmission may indicate the following transmission period before the next transmission (e.g., 20 subframes, 50 subframes, 100 subframes, 200 subframes, . . . , 1000 subframes, etc.).

The SCI 502 may carry information about the time and/or frequency of the resources for the second transmission. As illustrated, the SCI 502 may carry information about a time gap (e.g., subframe gap) between the two transmission, information about frequency resources for the second transmission (e.g., a starting subchannel). In FIG. 5, the first transmission is transmitted at subframe N, and has a gap of K subframes before the second transmission that occurs at subframe N+K. The first transmission is transmitted using a starting subchannel j, and the second transmission is transmitted using a starting subchannel i. For example, the SCI 502 may indicate the gap of K subframes and may indicate starting subchannel i for the second transmission. As illustrated by the arrow 507, the SCI 506 includes information about the data transmission 508 that enables receiving devices to receive the data 508, e.g., MCS information, information about the frequency and/or time resources used to transmit the data, whether the data in an initial transmission or a retransmission, etc. Additionally, as illustrated by the arrow 505, the SCI 502 may include information about SCI 506 and/or data 508. In some examples, the SCI 502 and SCI 506 may carry similar information. As noted above, the UE may randomly select the cyclic shift that is applied to the DM-RS in each subframe comprising the SCI. Thus, the SCI 502 and the SCI 506 would each have a randomly selected cyclic shift applied to the DM-RS in the subframe.

Figure 6:
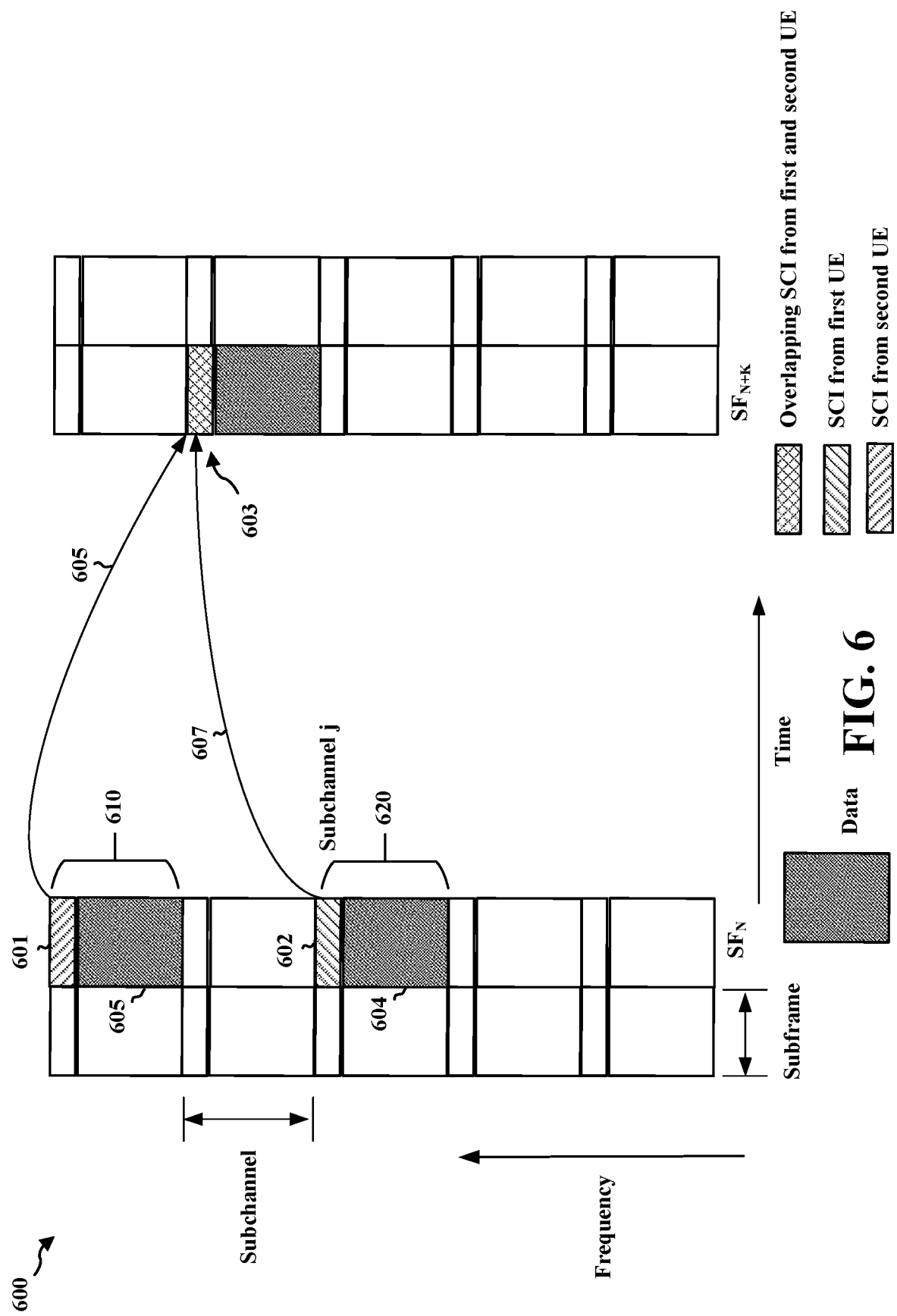
FIG. 6 illustrates an example of a collision between transmissions from two devices.

FIG. 6 illustrates an example of communication 600 involving a collision between transmissions from two different UEs. For example, a first UE may transmit SCI 601 indicating a second transmission using resources 603, as illustrated by the arrow 605. A different UE may transmit SCI 602 that indicates the same (or at least partially overlapping) time and/or frequency resources 603 for a second transmission, as indicated by the arrow 607. The second transmissions from the two UEs may be a retransmission, a SPS transmission, etc. For example, the first UE may transmit a first transmission 610 that includes SCI 601 and data 605 and transmits a second transmission (whether a retransmission of the first transmission 610 or an SPS transmission) using resources 603. A second UE may transmit a first transmission 620 that includes SCI 602 and data 604 and transmits a second transmission (whether a retransmission of the first transmission 620 or an SPS transmission) using resources 603. A UE receiving the overlapping PSCCHs transmissions from the two UE in resources 603 may be able to distinguish the SCI for the overlapping PSCCH transmissions if the DM-RS associated with the two transmissions have a different cyclic shift. If the DM-RS of the overlapping transmissions from the two UEs have randomly selected the same cyclic shift, the receiving UE may experience reduced blind decoding performance and/or a reduced signal-to-noise ratio (SNR). A collision may occur when one UE transmits in parallel with another UE and uses the same cyclic shift value from a set of four values for the DM-RS associated with the SCI. For two UEs that transmit in overlapping time and frequency resources, there is a probability of 4/16 that the two UEs will randomly select a same cyclic shift. Thus, there may be an approximately 25% collision rate for two UEs using overlapping time and frequency resources. If three UEs uses overlapping time and frequency resources to transmit, there is a probability of approximately 48/64=75% that at least two of the UEs will randomly select the same cyclic shift from a set or four cyclic shift values.

If the receiving UE is not able to accurately receive the SCI (e.g., the two SCIs that overlap in the resource 603), the receiving UE may not be able to accurately receive the corresponding data. In some examples, the UE might not exclude time and/or frequency resources for future transmissions indicated in the overlapping SCIs, if the UE is not able to receive the corresponding SCI. The overlapping SCIs that are not able to be received by the receiving UE may be considered non-detected PSCCHs. The reduced detection of overlapping SCIs may degrade communication by reducing congestion control among the UEs. The receiving UE may use measurements of signals received from other UEs to assist in the performance of link management. If a collision causes the receiving device to be unable to receive a PSCCH that the UE uses for link management, the receiving UE may miss synchronization information, timing offset information, etc., which may lead to a degradation of the link. Collisions may lead to reduced PSSCH performance because the receiving UE is unable to receive the SCI that carries the information for the PSSCH. Thus, the UE may drop the PSSCH based on a failure to detect, or correctly receive, the corresponding control information. In some examples, PSSCH may have a better decoding performance than PSCCH, e.g., based on MCS 0, 96 PRBs, etc. HARQ combining, e.g., with repetitions of transmissions, may provide assistance, e.g., even with poor conditions with a low SNR.

Aspects presented herein improve congestion control, link management, and PSSCH performance by providing a way for UEs to avoid selecting a same cyclic shift value for overlapping transmissions. As presented herein, a UE may provide information in one transmission that assists a receiving UE in determining a cyclic shift value applied to another transmission. By being aware of the cyclic shift value, the other UE may exclude the indicated cyclic shift value from its own selection of a cyclic shift. For example, in FIG. 6, the SCI 601 and/or 602 may carry information about a cyclic shift that will be used for the SCI that will be transmitted in resources 603. A UE that may transmit in parallel to the resources 603 may select a cyclic shift for its transmission from the remaining cyclic shift values. Excluding a cyclic shift that will be used by another UE reduces the potential for a collision between two UEs that transmit in overlapping resources from 25%, as described above, to 0%. In a collision involving three UEs that transmit in overlapping resources, the potential for a collision may be reduced from 75% to 3/9=33%. Therefore, the aspects presented herein may provide an improvement in PSSCH detection.

Figure 7:
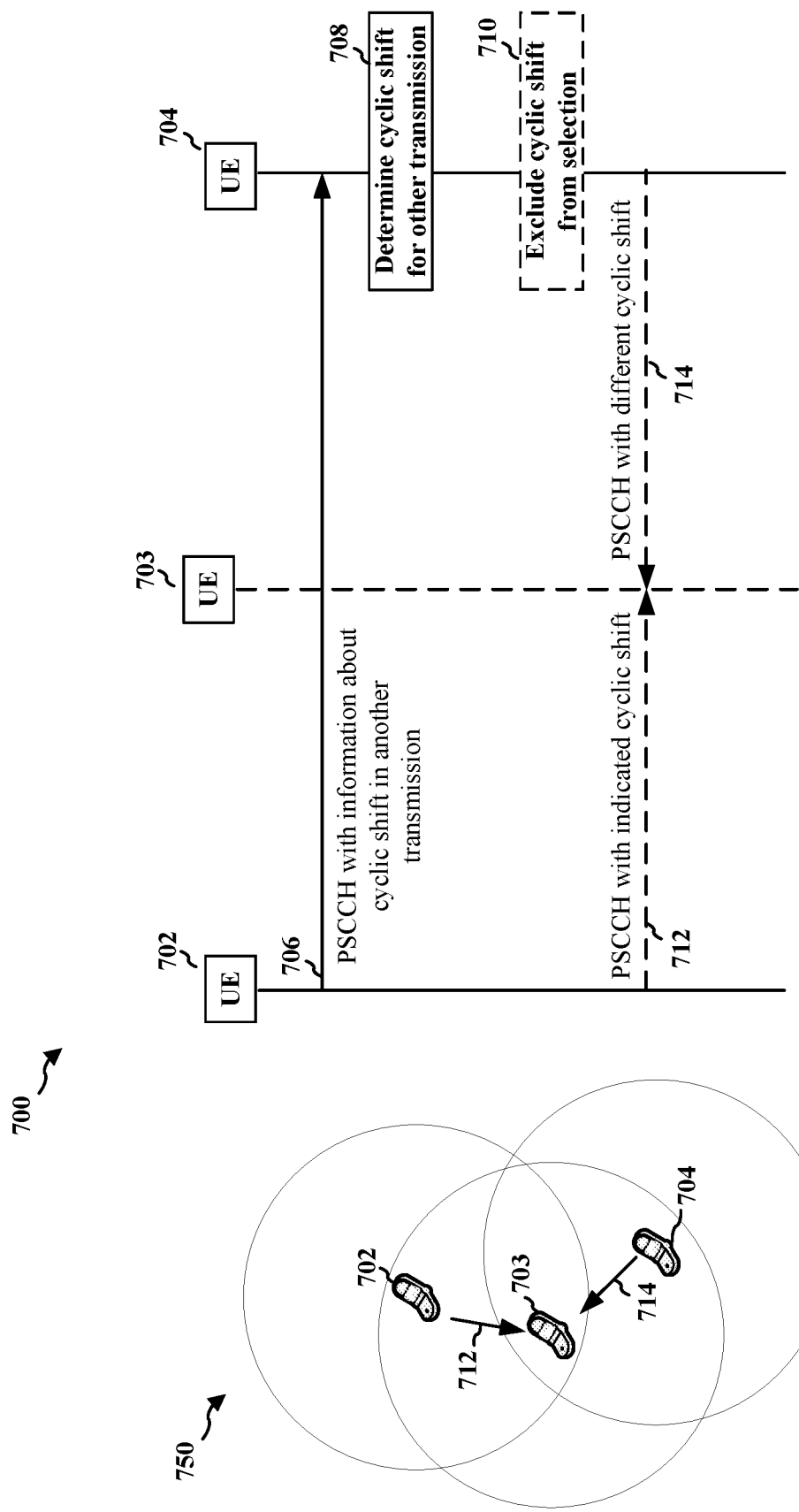
FIG. 7 illustrates an example communication flow between devices communicating based on V2X or other D2D communication.

FIG. 7 illustrates an example communication flow 700 between a first UE 702 and a second UE 704 involving the indication of cyclic shift information for DM-RS in a PSCCH. The communication may be based on V2X or other D2D based communication that is transmitted directly from a transmitting device to a receiving device. In some examples, the communication transmitting may be broadcast and received by multiple receiving devices within a range of the transmitting device, as described in connection with FIG. 4. Although this example involves UEs, the aspects of the communication flow may also be employed by other devices communicating based on sidelink, such as an RSU, etc. At 706, the UE 702 transmits a first transmission 706 that includes PSCCH and PSSCH, such as described in connection with FIGS. 4, 5, and/or 6. The first transmission comprises DM-RS having an applied cyclic shift value and carries information about a cyclic shift in another transmission. In some examples, the other transmission may be a retransmission of the first transmission 706. In other examples, the first transmission 706 and the other transmission may comprise SPS transmissions.

In a first example, the first transmission may comprise a PSCCH having SCI that indicates whether or not the cyclic shift value of the other transmission is the same as the cyclic shift of the first transmission 706. The cyclic shift of the first transmission may be randomly selected, e.g., from a set of values comprising {0, 3, 6, 9}, as described above. The information in the first transmission may indicate that the cyclic shift of the other transmission is the same or is randomly selected. For example, the SCI of the first transmission 706 may include a bit that indicates cyclic shift information for another transmission. If the bit has a first value, e.g., "1", the SCI may indicate that the cyclic shift has a same value as the cyclic shift applied to the DM-RS of the first transmission. If the bit has a second value, e.g., "0", the SCI may indicate that the cyclic shift of the DM-RS for the other transmission is a randomly selected value. Alternately, if the bit has a second value, e.g., "0", the SCI may indicate that the cyclic shift of the DM-RS for the other transmission is different that the cyclic shift applied in the first transmission, e.g., whether or not the cyclic shift was randomly selected. In another example, the cyclic shift information may include multiple bits comprised in the SCI. The cyclic shift information may indicate a value of the cyclic shift used in the other transmission. For example a set of 2 bits may use different combinations (e.g., 00, 01, 02, 03) to indicate the possible cyclic shift values, e.g., {0, 3, 6, 9}.

The UE 702 may determine whether or not to indicate the cyclic shift information based on a determined channel busy ratio (CBR). For example, if the CBR meets a threshold CBR limit, the UE 702 may determine to indicate the cyclic shift information when sending transmissions. Additionally or alternatively, the UE 702 may determine whether to select the cyclic shift of the second transmission randomly or based on the cyclic shift of the first transmission 706 based on the CBR limit. For example, if the CBR<CBR limit, the UE 702 may determine to select the cyclic shift for the second transmission randomly. If the CBR>CBR limit, the UE 702 may determine to use the same cyclic shift for the second transmission that the UE 702 used for the first transmission 706. The UE 702 may receive a CBR parameter, e.g., in an RRC configuration. In some examples, the UE 702 may receive an RRC configuration that indicates a behavior for the UE 702 to use in selecting a cyclic shift.

The receiving UE 704 may receive the first transmission and use the information comprised in the SCI to determine cyclic shift information for the other transmission, at 708. For example, the UE 704 may determine the value of the cyclic shift for the second transmission (e.g., transmission 712) if the information in the first transmission indicates that the cyclic shift of the second transmission has the same value as the first transmission or indicates the actual value for the cyclic shift of the second transmission. The UE 704 may determine that the cyclic shift will be randomly selected or will be different than the first transmission, e.g., dependent on the information carried in the first transmission 706. In some examples, the UE 704 may exclude, at 710, the indicated cyclic shift for the second transmission from a selection of a cyclic shift value for a sidelink transmission 714. For example, if the UE 704 determines at 708, at the cyclic shift for transmission 712 will be "3", the UE 704 may select a cyclic shift for sidelink transmission 714 from a set of values {0, 6, 9} by excluding "3" from the selection. Thus, even if transmission 712 and transmission 714 are transmitted in overlapping time and/or frequency resources, the two transmissions may avoid using the same cyclic shift value for the associated DM-RS, which may assist receiving devices in detecting/distinguishing the two transmissions and receiving the corresponding data. For example, a third UE 703 may receive the transmission 712 from the UE 702 and the transmission 714 from the UE 704 in overlapping time and/or frequency resources, as illustrated in FIG. 7, similar to the overlap described in connection with FIG. 6. As the UE 704 has selected a cyclic shift that is different than the cyclic shift used for the DM-RS of the transmission 712 by the UE 702 (e.g., by excluding the indicated cyclic shift from its selection of its own cyclic shift), the third UE 703 may be able to distinguish the two transmissions (e.g., 712 and 714) using the different cyclic shifts. An example communication diagram 750 that shows the third UE 703 receiving the two transmissions 712 and 714. Furthermore, the UE 703 may know the cyclic shift of the transmission 712 based on the information about the cyclic shift in the other transmission sent at 706.

Figure 8:
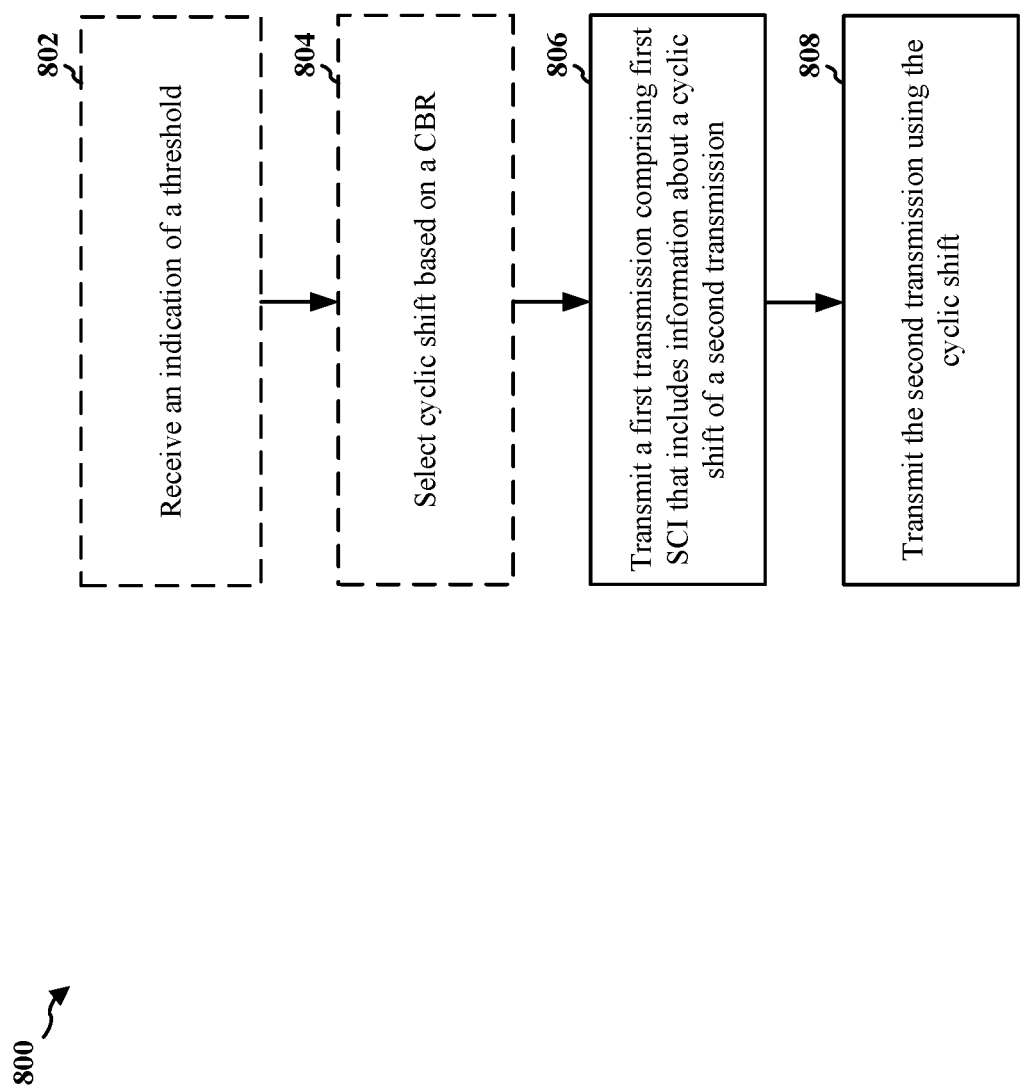
FIG. 8 is a flowchart of a method of wireless communication at a transmitting device.

FIG. 8 is a flowchart 800 of a method of wireless communication. The method may be performed by a UE, an RSU, or another wireless device communicating based on V2X or other D2D communication. For example, the method may be performed by a UE or a component of a UE (e.g., the UE 104 in FIG. 1, the UE 402 in FIG. 4, the UE 702 in FIG. 7; the device 310 or 350 in FIG. 3; the apparatus 1002/1002' in FIGS. 10 and 11; and/or the processing system 1114 in FIG. 11, which may include memory and which may be an entire UE or a component of a UE). Optional aspects are illustrated with a dashed line. The method may help improve PSSCH performance, improve link management and/or reduce congestion by providing information in a first transmission about a cyclic shift of a second transmission.

At 806, the UE transmits a first transmission comprising first SCI using a first cyclic shift, where the first SCI includes information about a second cyclic shift of second SCI for a second transmission from the UE. For example, the transmission may be performed, e.g., by the cyclic shift information component 1008 and/or the transmission component 1006 of the apparatus 1002 in FIG. 10. For example, the first transmission may include a PSCCH transmission that includes DM-RS with the first cyclic shift. The first transmission may include aspects described in connection with 706 in FIG. 7. The SCI of the first transmission may include aspects described in connection with SCI 502 in FIG. 5 and/or SCI 601 or 602 in FIG. 6. The first cyclic shift may be randomly selected (e.g., from a set of values such as {0, 3, 6, 9}), and the information may indicate whether or not the second cyclic shift of the second SCI is the same as the first cyclic shift. For example, a first bit value (e.g., "1") may indicate that the second cyclic shift of the second SCI is the same as the randomly selected cyclic shift and a second bit value (e.g., "0") may indicate that the second cyclic shift of the second SCI is randomly selected. As another example, a first bit value (e.g., "1") may indicate that the second cyclic shift of the second SCI is the same as the randomly selected cyclic shift and a second bit value (e.g., "0") may indicate that the second cyclic shift of the second SCI is different than the first cyclic shift. The information may comprise a single bit of the first SCI in the first transmission. The information may indicate a value of the second cyclic shift for the second SCI. The information may comprise multiple bits, as described in connection with FIG. 7.

At 808, the UE transmits the second transmission comprising the second SCI using the second cyclic shift. For example, the transmission may be performed, e.g., by the cyclic shift information component 1008 and/or the transmission component 1006 of the apparatus 1002 in FIG. 10. The second transmission may be a retransmission of the first transmission. The first transmission and the second transmission may comprise SPS transmissions.

At 804, the UE may select the second cyclic shift of the second SCI based on a determined. For example, the selection may be performed, e.g., by the selection component 1010 and/or the transmission component 1006 of the apparatus 1002 in FIG. 10. For example, the UE may select the second cyclic shift of the second SCI that is the same as the first cyclic shift if the CBR meets a threshold, and may select the second cyclic shift of the second SCI so that it is different than the first cyclic shift if the CBR is below a threshold.

As illustrated at 802, the threshold that the UE uses may be a received threshold. Thus, the UE may receive an indication of the threshold, e.g., in an RRC configuration. For example, the reception of the threshold may be performed, e.g., by the CBR component 1012 and/or the transmission component 1006 of the apparatus 1002 in FIG. 10.

Figure 9:
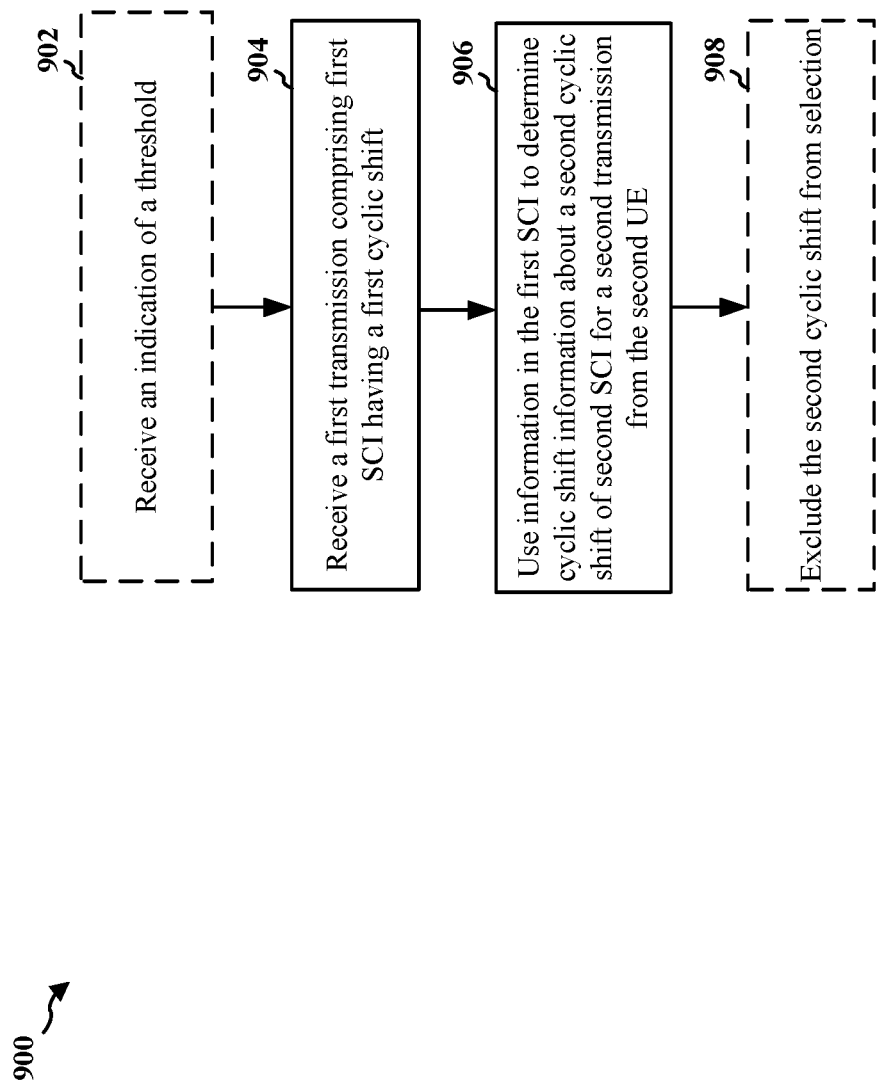
FIG. 9 is a flowchart of a method of wireless communication at a transmitting device.

FIG. 9 is a flowchart 900 of a method of wireless communication. The method may be performed by a UE, an RSU, or another wireless device communicating based on V2X or other D2D communication. For example, the method may be performed by a UE or a component of a UE (e.g., the UE 104 in FIG. 1, the UE 402 in FIG. 4, the UE 704 in FIG. 7; the device 310 or 350 in FIG. 3; the apparatus 1002/1002' in FIG. 10 or 11; or the processing system 1114 in FIG. 11, which may include memory and which may be an entire UE or a component of a UE). Optional aspects are illustrated with a dashed line. The method may help improve PSSCH performance, improve link management and/or reduce congestion by providing information in a first transmission about a cyclic shift of a second transmission.

At 904, the first UE receives, from a second UE, a first transmission comprising first SCI and having a first cyclic shift. For example, the reception may be performed, e.g., by the reception component 1004 of the apparatus 1002 in FIG. 10. For example, the first transmission may include a PSCCH transmission that includes DM-RS with the first cyclic shift. The first transmission may include aspects described in connection with 706 in FIG. 7. The SCI of the first transmission may include aspects described in connection with SCI 502 in FIG. 5 and/or SCI 601 or 602 in FIG. 6. The first cyclic shift may be randomly selected (e.g., from a set of values such as {0, 3, 6, 9}).

At 906, the first UE uses information in the first SCI to determine cyclic shift information about a second cyclic shift of second SCI for a second transmission from the second UE. For example, the determination may be performed, e.g., by the cyclic shift information component 1008 of the apparatus 1002 in FIG. 10. The second transmission may be a retransmission of the first transmission. The first transmission and the second transmission may comprise SPS transmissions. The first cyclic shift may be randomly selected, and the information may indicate whether the cyclic shift of the second SCI is the same as the first cyclic shift. For example, a first bit value (e.g., "1") may indicate that the second cyclic shift of the second SCI is the same as the randomly selected cyclic shift and a second bit value (e.g., "0") may indicate that the second cyclic shift of the second SCI is randomly selected. As another example, a first bit value (e.g., "1") may indicate that the second cyclic shift of the second SCI is the same as the randomly selected cyclic shift and a second bit value (e.g., "0") may indicate that the second cyclic shift of the second SCI is different than the first cyclic shift. The information may comprise a single bit. The information may indicate a value of the second cyclic shift for the second SCI. The information may comprise multiple bits. At 906, the first UE may determine the second cyclic shift of the second SCI based additionally on a CBR. For example, the second cyclic shift of the second SCI may be the same as the first cyclic shift if the CBR meets a threshold, and the second cyclic shift of the second SCI may different than the first cyclic shift of the CBR is below a threshold.

As illustrated at 902, the first UE may receive an indication of the threshold, e.g., in an RRC configuration. For example, the reception of the threshold may be performed, e.g., by the CBR component 1012 and/or the transmission component 1006 of the apparatus 1002 in FIG. 10.

At 908, the first UE may exclude the second cyclic shift from its own selection of a cyclic shift for SCI of its own transmission using the information received in the first SCI. The SCI of the first UE may be referred to as a third SCI to distinguish from the first SCI and the second SCI of the second UE. For example, the exclusion may be performed by the selection component 1010 of the apparatus 1002. An example of the UE 704 excluding the indicated cyclic shift is described in connection with FIG. 7. For example, the first UE may exclude the second cyclic shift based on the first cyclic shift if the information indicates that the second cyclic shift is the same as the first cyclic shift. In another example, the first UE may exclude a value of the second cyclic shift based on the information indicating the value of the second cyclic shift.

Figure 10:
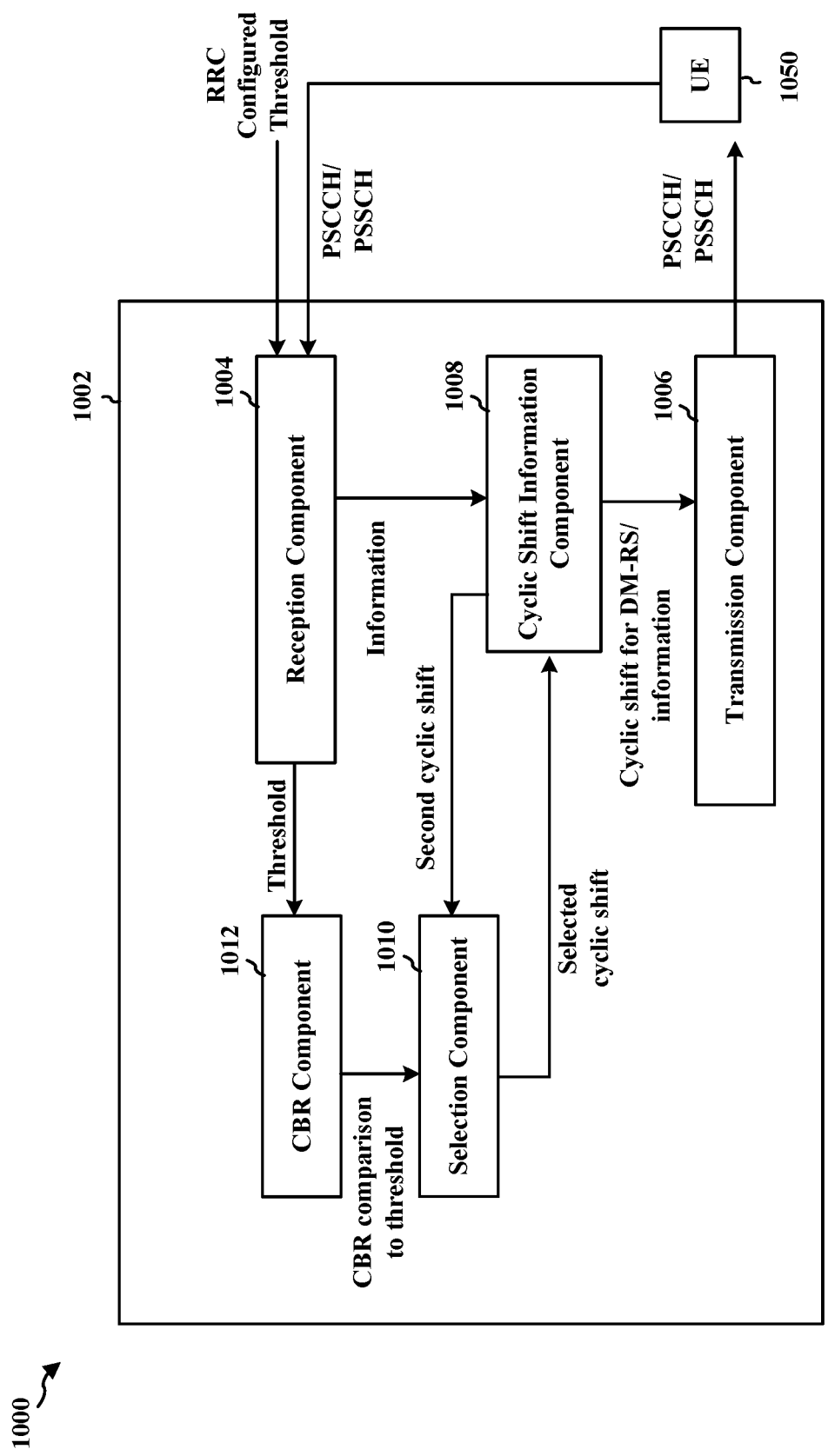
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a UE or a component of a UE. In other examples, the apparatus may comprise an RSU or a component of an RSU, or another device communicating based on V2X or D2D communication. The apparatus includes a reception component 1004 that received communication, such as V2X communication from other UE(s) 1050, and a transmission component 1006 that transmits communication, such as V2X communication to other UE(s) 1050. The apparatus 1002 includes a cyclic shift information component 1008 configured to a first transmission comprising first SCI using a first cyclic shift, where the first SCI includes information about a second cyclic shift of second SCI for a second transmission from the UE, e.g., as described in connection with 806 in FIG. 8. The apparatus 1002 includes a selection component 1010 configured to select the second cyclic shift of the second SCI, e.g., as described in connection with 804 of FIG. 8. The apparatus includes a CBR component 1012 configured to receive an indication of a threshold, e.g., as described in connection with 802 of FIG. 8 and/or 902 of FIG. 9. If the apparatus 1002 is a receiving apparatus, the cyclic shift information component 1008 may be configured to receive, from a second UE 1050, a first transmission comprising first SCI and having a first cyclic shift and having information about a cyclic shift of a second SCI. The cyclic shift information component 1008 may be configured to use the information to determine cyclic shift information about the second transmission, e.g., whether the cyclic shift is the same as for the first transmission, whether the cyclic shift is different, whether the cyclic shift is randomly selected, a value of the cyclic shift, etc. The selection component 1010 may be configured to exclude the second cyclic shift from selection, e.g., as described in connection with 908.

The apparatus may include additional components that perform each of the blocks of the algorithm in the aforementioned flowcharts of FIGS. 8 and/or 9, and the aspects described in connection with FIG. 7. As such, each block in the aforementioned flowcharts of FIGS. 8 and/or 9, and the aspects described in connection with FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
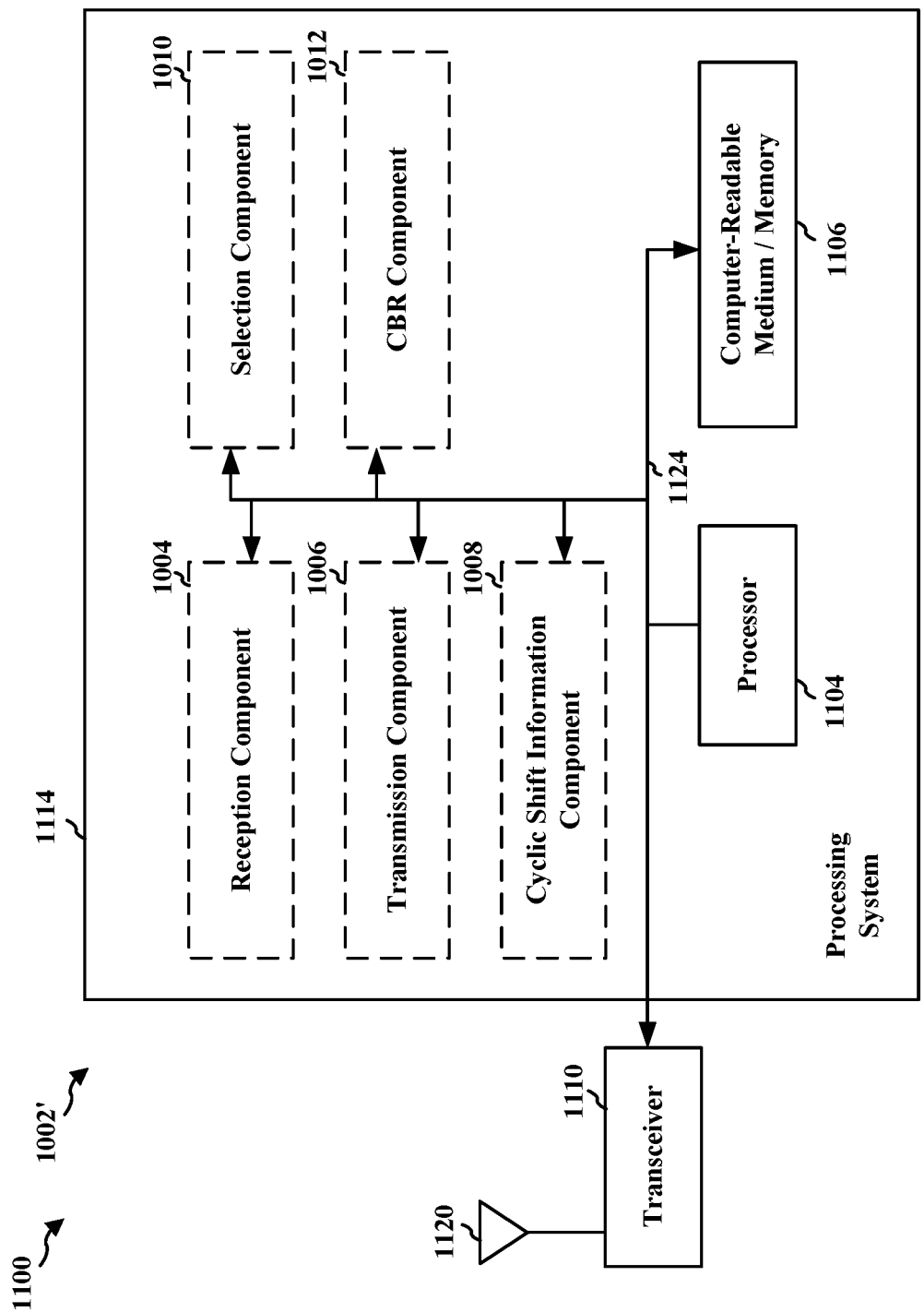
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012. The components may be software components running in the processor 1104, resident/stored in the computer readable medium/memory 1106, one or more hardware components coupled to the processor 1104, or some combination thereof The processing system 1114 may be a component of the device 310 or the device 350 and may include the memory 376, 360 and/or at least one of the TX processor 316, 368, the RX processor 370, 356, and the controller/processor 375, 359. Alternatively, the processing system 1114 may be the entire UE (e.g., see the device 310 or 350 of FIG. 3).

In one configuration, the apparatus 1002/1002' for wireless communication includes means for transmitting a first transmission comprising first sidelink control information (SCI) using a first cyclic shift, wherein the first SCI includes information about a second cyclic shift of second SCI for a second transmission from the UE, e.g., as described in connection with 806 in FIG. 8, and means for transmitting the second transmission comprising the second SCI using the second cyclic shift, e.g., as described in connection with 808 in FIG. 8. The apparatus 1002/1002' may further include means for selecting the second cyclic shift of the second SCI based on a CBR, e.g., as described in connection with 804 in FIG. 8. The apparatus 1002/1002' may further include means for receiving an indication of the threshold in an RRC configuration, e.g., as described in connection with 802 in FIG. 8. The apparatus 1002/1002' may further include means for receiving, from a second UE, a first transmission comprising first SCI having a first cyclic shift, e.g., as described in connection with 904 in FIG. 9. The apparatus 1002/1002' may further include means for using information in the first SCI to determine cyclic shift information about a second cyclic shift of second SCI for a second transmission from the UE, e.g., as described in connection with 906 in FIG. 9. The apparatus 1002/1002' may further include means for excluding the second cyclic shift from its selection of a cyclic shift for SCI in its own transmission using the information received in the first SCI, e.g., as described in connection with 908 in FIG. 9. The aforementioned means may be one or more of the aforementioned components of the apparatus 1002 and/or the processing system 1114 of the apparatus 1002' configured to perform the functions recited by the aforementioned means. As described supra, the processing system 1114 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other embodiments or teaching described herein, without limitation.

Example 1 is a method of wireless communication at a UE, comprising: transmitting a first transmission comprising first SCI using a first cyclic shift, wherein the first SCI includes information about a second cyclic shift of second SCI for a second transmission from the UE; and transmitting the second transmission comprising the second SCI using the second cyclic shift.

In Example 2, the method of Example 1 further includes that the second transmission is a retransmission of the first transmission.

In Example 3, the method of Example 1 or Example 2 further includes that the first transmission and the second transmission are SPS transmissions.

In Example 4, the method of any of Examples 1-3 further includes that the first cyclic shift is randomly selected, and the information indicates whether the second cyclic shift of the second SCI is the same as the first cyclic shift.

In Example 5, the method of any of Examples 1-4 further includes that a first bit value indicates that the second cyclic shift of the second SCI is the same as the first cyclic shift, and a second bit value indicates that the second cyclic shift of the second SCI is randomly selected.

In Example 6, the method of any of Examples 1-5 further includes that a first bit value indicates that the second cyclic shift of the second SCI is the same as the first cyclic shift and a second bit value indicates that the second cyclic shift of the second SCI is different than the first cyclic shift.

In Example 7, the method of any of Examples 1-6 further includes that the information comprises a single bit.

In Example 8, the method of any of Examples 1-7 further includes that the information indicates a value of the second cyclic shift for the second SCI.

In Example 9, the method of any of Examples 1-8 further includes that the information comprises multiple bits.

In Example 10, the method of any of Examples 1-9 further includes selecting the second cyclic shift of the second SCI based on a CBR.

In Example 11, the method of any of Examples 1-10 further includes that the second cyclic shift of the second SCI is the same as the first cyclic shift if the CBR meets a threshold, and the second cyclic shift of the second SCI is different than the first cyclic shift if the CBR is below the threshold.

In Example 12, the method of any of Examples 1-11 further includes receiving an indication of the threshold in a RRC configuration.

Example 13 is a device including one or more processors and one or more memories in electronic communication with the one or more processors storing instructions executable by the one or more processors to cause the device to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a method of wireless communication at a first UE, comprising:
receiving, from a second UE, a first transmission comprising first SCI having a first cyclic shift; and using information in the first SCI to determine cyclic shift information about a second cyclic shift of second SCI for a second transmission from the UE.

In Example 17, the method of Example 16 further includes that the second transmission is a retransmission of the first transmission.

In Example 18, the method of Example 16 or Example 17 further includes that the first transmission and the second transmission are SPS transmissions.

In Example 19, the method of any of Examples 16-18 further includes excluding the second cyclic shift from selection for a third SCI from the first UE using the information received in the first SCI.

In Example 20, the method of any of Examples 16-19 further includes that excluding the first UE excludes the second cyclic shift based on the first cyclic shift if the information indicates that the second cyclic shift is the same as the first cyclic shift.

In Example 21, the method of any of Examples 16-20 further includes that the first UE excludes a value of the second cyclic shift based on the information indicating the value of the second cyclic shift.

In Example 22, the method of any of Examples 16-21 further includes that the first cyclic shift is randomly selected, and the information indicates whether the second cyclic shift of the second SCI is the same as the first cyclic shift.

In Example 23, the method of any of Examples 16-22 further includes that a first bit value indicates that the second cyclic shift of the second SCI is the same as the first cyclic shift and a second bit value indicates that the second cyclic shift of the second SCI is randomly selected.

In Example 24, the method of any of Examples 16-23 further includes that a first bit value indicates that the second cyclic shift of the second SCI is the same as the first cyclic shift and a second bit value indicates that the second cyclic shift of the second SCI is different than the first cyclic shift.

In Example 25, the method of any of Examples 16-24 further includes that the information comprises a single bit.

In Example 26, the method of any of Examples 16-25 further includes that the information indicates a value of the second cyclic shift for the second SCI.

In Example 27, the method of any of Examples 16-26 further includes that the information comprises multiple bits.

In Example 28, the method of any of Examples 16-27 further includes determining the second cyclic shift of the second SCI based on a CBR.

In Example 29, the method of any of Examples 16-28 further includes that the second cyclic shift of the second SCI is the same as the first cyclic shift if the CBR meets a threshold, and the second cyclic shift of the second SCI is different than the first cyclic shift if the CBR is below the threshold.

In Example 30, the method of any of Examples 16-29 further includes receiving an indication of the threshold in a RRC configuration.

Example 31 is a device including one or more processors and one or more memories in electronic communication with the one or more processors storing instructions executable by the one or more processors to cause the device to implement a method as in any of Examples 16-30.

Example 32 is a system or apparatus including means for implementing a method or realizing an apparatus as in any of Examples 16-30.

Example 33 is a non-transitory computer readable medium storing instructions executable by one or more processors to cause the one or more processors to implement a method as in any of Examples 16-30.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   transmitting a first transmission comprising a first physical sidelink shared channel (PSSCH) and a first sidelink control information (SCI), the first SCI using a first cyclic shift, wherein the first SCI includes information about a second cyclic shift of second SCI for a second transmission comprising a second PSSCH, the second SCI and the second PSSCH to be transmitted as a future transmission from the UE and the second cyclic shift to be excluded from selection by a receiving UE for a third SCI; and
   transmitting the second transmission comprising the second PSSCH and the second SCI using the second cyclic shift.

2. The method of claim 1, wherein the second transmission is a retransmission of the first transmission.

3. The method of claim 1, wherein the first transmission and the second transmission are semi-persistent scheduling (SPS) transmissions.

4. The method of claim 1, wherein the first cyclic shift is randomly selected, and the information indicates whether the second cyclic shift of the second SCI is a same cyclic shift as the first cyclic shift.

5. The method of claim 4, wherein a first bit value indicates that the second cyclic shift of the second SCI is the same cyclic shift as the first cyclic shift, and a second bit value indicates that the second cyclic shift of the second SCI is randomly selected.

6. The method of claim 1, wherein a first bit value indicates that the second cyclic shift of the second SCI is a same cyclic shift as the first cyclic shift and a second bit value indicates that the second cyclic shift of the second SCI is different than the first cyclic shift.

7. The method of claim 1, wherein the information comprises a single bit.

8. The method of claim 1, wherein the information indicates a value of the second cyclic shift for the second SCI.

9. The method of claim 8, wherein the information comprises multiple bits.

10. The method of claim 1, further comprising:
    selecting the second cyclic shift of the second SCI based on a channel busy ratio (CBR).

11. The method of claim 10, wherein the second cyclic shift of the second SCI is a same cyclic shift as the first cyclic shift if the CBR meets a threshold, and the second cyclic shift of the second SCI is different than the first cyclic shift if the CBR is below the threshold.

12. The method of claim 11, further comprising:
    receiving an indication of the threshold in a radio resource control (RRC) configuration.

13. A method of wireless communication at a first user equipment (UE), comprising:
    receiving, from a second UE, a first transmission comprising a first physical sidelink shared channel (PSSCH) and a first sidelink control information (SCI), the first SCI having a first cyclic shift;
    using information in the first SCI to determine cyclic shift information about a second cyclic shift of second SCI for a second transmission comprising a second PSSCH to be transmitted as a future transmission from the second UE; and
    excluding the second cyclic shift from selection for a third SCI from the first UE using the information received in the first SCI.

14. The method of claim 13, wherein the second transmission is a retransmission of the first transmission.

15. The method of claim 13, wherein the first transmission and the second transmission are semi-persistent scheduling (SPS) transmissions.

16. The method of claim 13, the first UE excludes the second cyclic shift based on the first cyclic shift if the information indicates that the second cyclic shift is a same cyclic shift as the first cyclic shift.

17. The method of claim 13, wherein the first UE excludes a value of the second cyclic shift based on the information indicating the value of the second cyclic shift.

18. The method of claim 13, wherein the first cyclic shift is randomly selected, and the information indicates whether the second cyclic shift of the second SCI is a same cyclic shift as the first cyclic shift.

19. The method of claim 18, wherein a first bit value indicates that the second cyclic shift of the second SCI is the same cyclic shift as the first cyclic shift and a second bit value indicates that the second cyclic shift of the second SCI is randomly selected.

20. The method of claim 13, wherein a first bit value indicates that the second cyclic shift of the second SCI is a same cyclic shift as the first cyclic shift and a second bit value indicates that the second cyclic shift of the second SCI is different than the first cyclic shift.

21. The method of claim 13, wherein the information comprises a single bit.

22. The method of claim 13, wherein the information indicates a value of the second cyclic shift for the second SCI.

23. The method of claim 22, wherein the information comprises multiple bits.

24. The method of claim 13, further comprising:
    determining the second cyclic shift of the second SCI based on a channel busy ratio (CBR).

25. The method of claim 24, wherein the second cyclic shift of the second SCI is a same cyclic shift as the first cyclic shift if the CBR meets a threshold, and the second cyclic shift of the second SCI is different than the first cyclic shift if the CBR is below the threshold.

26. The method of claim 25, further comprising:
    receiving an indication of the threshold in a radio resource control (RRC) configuration.

27. An apparatus for wireless communication at a user equipment (UE), comprising:
    a memory; and
    at least one processor coupled to the memory and configured to:
        transmit a first transmission comprising a physical sidelink shared channel (PSSCH) and a first sidelink control information (SCI), the first SCI using a first cyclic shift, wherein the first SCI includes information about a second cyclic shift of second SCI for a second transmission comprising a second PSSCH, the second SCI and the second PSSCH to be transmitted as a future transmission from the UE and the second cyclic shift to be excluded from selection by a receiving UE for a third SCI; and
        transmit the second transmission comprising the second PSSCH and the second SCI using the second cyclic shift.

28. An apparatus for wireless communication at a first user equipment (UE), comprising:

a memory; and at least one processor coupled to the memory and configured to:

receive, from a second UE, a first transmission comprising a first physical sidelink shared channel (PSSCH) and a first sidelink control information (SCI), the first SCI having a first cyclic shift;

use information in the first SCI to determine cyclic shift information about a second cyclic shift of second SCI for a second transmission comprising a second PSSCH to be transmitted as a future transmission from the second UE; and exclude the second cyclic shift from selection for a third SCI from the first UE using the information received in the first SCI.

* * * * *